United States Patent
Sato et al.

(10) Patent No.: US 10,212,317 B2
(45) Date of Patent: Feb. 19, 2019

(54) REARWARD IMAGING DEVICE

(71) Applicant: MURAKAMI CORPORATION, Shizuoka (JP)

(72) Inventors: Hidenori Sato, Shizuoka (JP); Kenji Ichikawa, Shizuoka (JP)

(73) Assignee: MURAKAMI CORPORATION, Shizuoka (JP)

( * ) Notice: Subject to any disclaimer, the term of this patent is extended or adjusted under 35 U.S.C. 154(b) by 51 days.

(21) Appl. No.: 15/121,194

(22) PCT Filed: Mar. 2, 2015

(86) PCT No.: PCT/JP2015/056036
§ 371 (c)(1),
(2) Date: Aug. 24, 2016

(87) PCT Pub. No.: WO2015/129911
PCT Pub. Date: Sep. 3, 2015

(65) Prior Publication Data
US 2016/0373620 A1 Dec. 22, 2016

(30) Foreign Application Priority Data
Feb. 28, 2014 (JP) .................................. 2014-038953

(51) Int. Cl.
*H04N 5/225* (2006.01)
*B60R 1/06* (2006.01)
(Continued)

(52) U.S. Cl.
CPC .............. *H04N 5/2252* (2013.01); *B60R 1/00* (2013.01); *B60R 1/06* (2013.01); *B60R 11/0235* (2013.01);
(Continued)

(58) Field of Classification Search
CPC .... H04N 5/2252; H04N 5/225; H04N 5/2254; H04N 5/2257; B60R 1/00; B60R 1/06;
(Continued)

(56) References Cited

U.S. PATENT DOCUMENTS 6,959,994 B2 * 11/2005 Fujikawa .................. B60R 1/00
348/148
2010/0165100 A1 7/2010 Asai

FOREIGN PATENT DOCUMENTS

CN 201914182 8/2011
CN 203402084 1/2014
(Continued)

OTHER PUBLICATIONS

Japanese Office Action for JP App. No. 2014-038953 dated Oct. 10, 2017, along with English-language translation thereof.
(Continued)

*Primary Examiner* — Thai Q Tran
*Assistant Examiner* — Christopher Braniff
(74) *Attorney, Agent, or Firm* — Greenblum & Berbstein, P.L.C.

(57) ABSTRACT

The present invention is a rearward imaging device attached to a moving body such as a vehicle, and is provided with an imaging device for capturing images rearward of the moving body, and a housing for accommodating the imaging device. The imaging device has a barrel for holding a transparent member, and a concave part is formed in the rear part of the housing. The barrel penetrates a bottom part of the concave part and protrudes further rearward than a bottom surface of the concave part.

5 Claims, 4 Drawing Sheets

(51) Int. Cl.
    *B60R 11/02* (2006.01)
    *G03B 17/08* (2006.01)
    *B60R 1/00* (2006.01)
    *B60R 11/00* (2006.01)
(52) U.S. Cl.
    CPC .............. *G03B 17/08* (2013.01); *H04N 5/225* (2013.01); *H04N 5/2254* (2013.01); *H04N 5/2257* (2013.01); *B60R 2011/004* (2013.01); *B60R 2300/802* (2013.01); *B60R 2300/8046* (2013.01)
(58) Field of Classification Search
    CPC ........... B60R 11/0235; B60R 2011/004; B60R 2300/802; B60R 2300/8046; G03B 17/08
    See application file for complete search history.

(56) References Cited

FOREIGN PATENT DOCUMENTS

| JP | 11-240384 | 9/1999 |
|---|---|---|
| JP | 2006-313312 | 11/2006 |
| JP | 2007-137098 | 6/2007 |
| JP | 2008-296789 | 12/2008 |
| JP | 2009-241749 | 10/2009 |
| JP | 2011-184030 | 9/2011 |
| JP | 2011184030 | * 9/2011 |
| JP | 2013-18404 | 1/2013 |

OTHER PUBLICATIONS

International Search Report, along with English-language translation thereof, for PCT/JP2015/056036 dated May 19, 2015.
Official Action, along with English-language translation thereof, issued in CN Appl. No. 201580010693.5 dated Jul. 24, 2017.
Office Action issued in Japan Counterpart Patent Appl. No. 2014-038953, dated Oct. 2, 2018 , along with an English translation thereof.

* cited by examiner

REARWARD IMAGING DEVICE

TECHNICAL FIELD

The present invention relates to a rearward imaging device which captures an image of the rear side of the movable body.

BACKGROUND ART

Conventionally, mirrors which reflect the rear side (including the rear lateral sides) of a vehicle are arranged on the lateral sides of the front portion of the vehicle, and the vehicle is configured such that the driver can confirm the situation on the rear side by viewing the mirrors.

On the other hand, in recent years, systems in which an image of the rear side of the vehicle is captured by attaching an imaging unit instead of the mirror and the captured image is displayed on a meter panel or the like have been studied. According to such systems, the driver can confirm the situation on the rear side of the vehicle without greatly averting the driver's eyes from the forward direction.

Patent Literature 1 discloses a rearward imaging device which is provided with an imaging unit and a housing for housing the imaging unit, and captures an image of the rear side of the vehicle.

In the rearward imaging device according to Patent Literature 1, a concavity having the shape of a bottomed cylinder is formed in a rear portion of the housing. A lens which is held in a barrel of the imaging unit, or a lens filter which covers the lens, is arranged at the bottom of the concavity, and the imaging unit captures an image of the rear side of the vehicle through the bottom of the concavity. Hereinafter, the lens or the lens filter which is held at a tip end portion of the barrel is referred to as "the transparent member".

CITATION LIST

Patent Literature

Patent Literature 1: Japanese Patent Laid-open No. 2009-241749

SUMMARY OF INVENTION

Technical Problem

There is a property that turbulence is likely to occur on the rear side of the housing during traveling of the vehicle. Even when the housing has a streamlined shape, a similar property exists.

Therefore, in the housing in which a concavity is formed in the rear portion, water drops in contact with the outer circumferential surface of the housing can be caught in the turbulence and sneak into the inside of the concavity. Further, when the water drops in contact with the inner circumferential surface of the concavity move to the bottom surface side of the concavity, the water drops can come into contact with the transparent member, which is held in the barrel, so that images of the water drops can appear in the captured image.

The present invention has been made to solve the above problem, and the object of the present invention is to provide a rearward imaging device in which images of water drops are unlikely to appear in the captured image.

Solution to Problem

The present invention, which solves the aforementioned problem, provides a rearward imaging device for being attached to a movable body. The rearward imaging device according to the present invention includes an imaging unit which captures an image of a rear side of the movable body, and a housing which houses the imaging unit. The imaging unit has a barrel which holds a transparent member, and a concavity is formed in a rear portion of the housing. The barrel penetrates through a bottom portion of the concavity, and protrudes rearward from a bottom surface of the concavity.

According to the present invention, the transparent member which is held by the barrel is apart from the bottom surface of the concavity, and therefore the inner circumferential surface of the concavity does not continue to the transparent member. Thus, the water drops which move to the bottom surface of the concavity mainly come into contact with the outer circumferential surface of the barrel, and are not likely to come into contact with the transparent member.

In addition, in the case where the distance (L2) from the inner surface of the concavity to the rear end of the barrel is smaller than the protrusion length (L1) in the barrel, even when the diameters of the water drops moving on the inner surface of the concavity are smaller than the protrusion length (L1), the water drops can come into contact with the rear end of the barrel. On the other hand, in the case where the distance (L2) from the inner surface of the concavity to the rear end of the barrel is arranged to be equal to or greater than the protrusion length (L1) in the barrel, the water drops do not come into contact with the rear end of the barrel as long as the diameters of the water drops moving on the inner surface of the concavity do not exceed the protrusion length (L1).

In other words, it is preferable that the distance from the inner surface of the concavity to an edge of the rear end of the barrel be equal to or greater than the protrusion length in the barrel. In this case, the water drops moving on the inner surface of the concavity are unlikely to come into contact with the rear end of the barrel and are further unlikely to come into contact with the transparent member.

The "inner surface" of the concavity means the combined surface of the inner circumferential surface and the bottom surface of the concavity.

In addition, it is preferable that the protrusion length in the barrel be greater than the maximum width of the annular area between the rear edge of the outer circumferential surface of the housing and the opening edge of the concavity.

There is a tendency that the diameters of the water drops which come into contact with the annular area (i.e., the rear end face of the housing) between the rear edge of the outer circumferential surface of the housing and the opening edge of the concavity are equal to or smaller than the width of the annular area. In other words, the diameters of the water drops which move to the inner surface of the concavity along the rear end face of the housing tend to be equal to or smaller than the width of the annular area.

Therefore, in the arrangement in which the protrusion length in the barrel is greater than the maximum width of the aforementioned annular area, even when water drops reach the bottom surface, the possibility of the water drops coming into contact with the rear end of the barrel is small, and Therefore the water drops are unlikely to come into contact with the transparent member.

Advantageous Effect of Invention

As explained above, according to the present invention, water drops are unlikely to come into contact with the transparent member even when the water drops move to the bottom surface of the concavity, and influences of the water drops are unlikely to be reflected in the image.

DESCRIPTION OF EMBODIMENT

An embodiment of the present invention is explained in detail with reference to drawings as needed.

In the explanations on the embodiment, a case in which the "movable body" is a four-wheeled vehicle (which is hereinafter simply referred to as "the vehicle V") is taken as an example. In addition, the forward side of the vehicle V is referred to as "front", and the rearward side of the vehicle V is referred to as "rear". Further, the "right" and "left" directions are based on the position of the driver.

Figure 1:
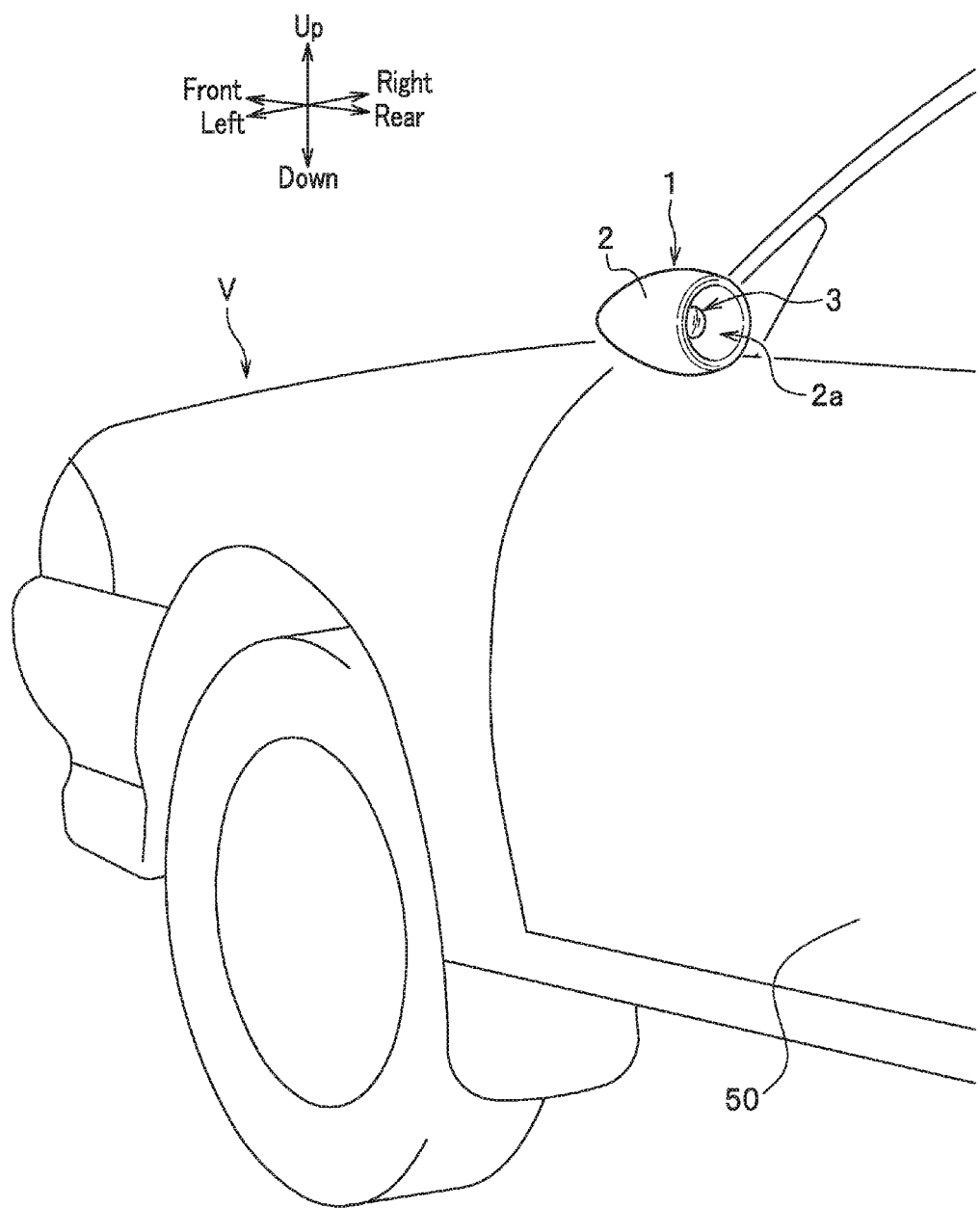
FIG. 1 is a perspective diagram illustrating a vehicle on which a rearward imaging device according to an embodiment is mounted.
Figure 2:
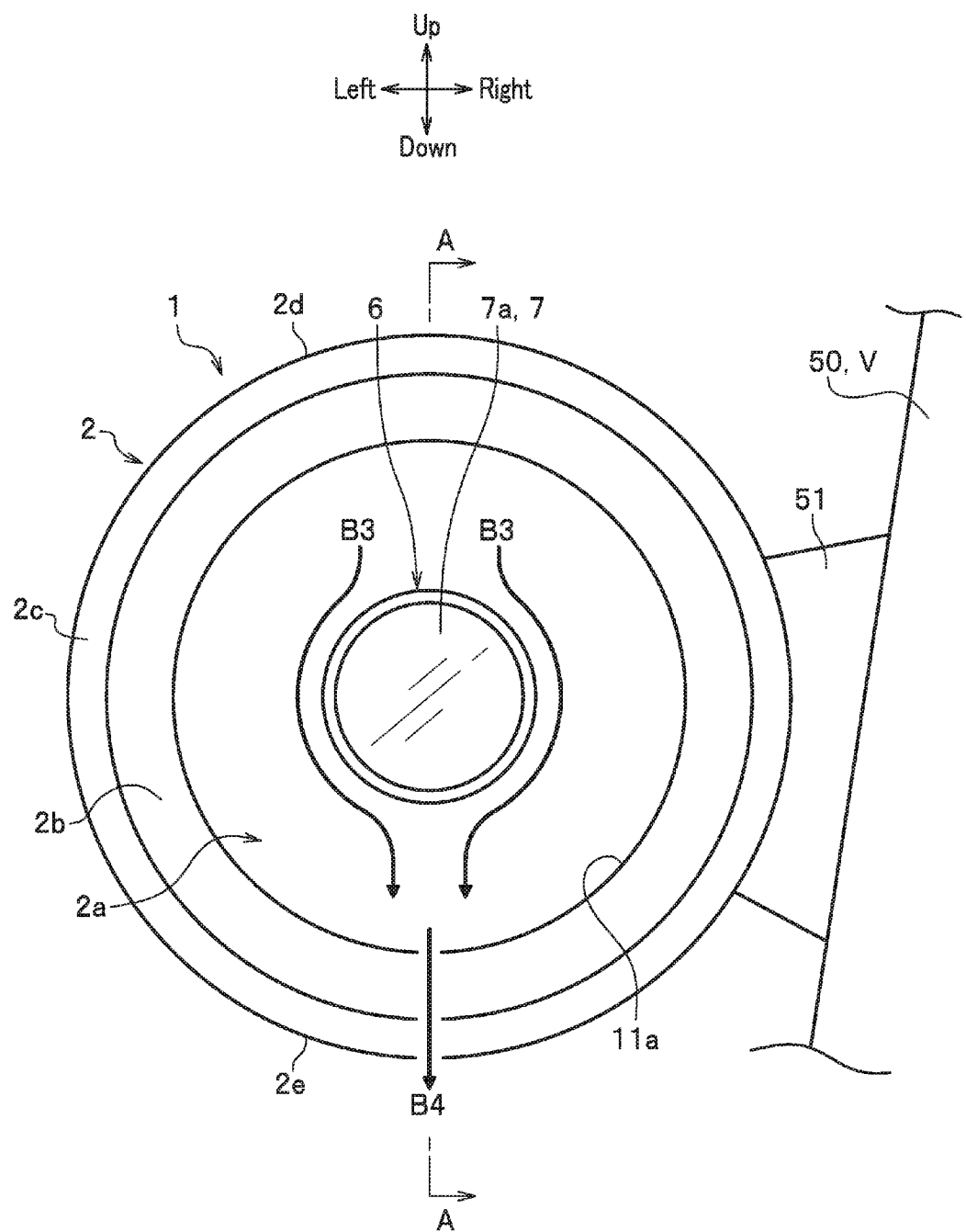
FIG. 2 is a rear view of the rearward imaging device according to an embodiment.

As illustrated in FIGS. 1 and 2, the rearward imaging device 1 is arranged on the left lateral side of a left door 50 of the vehicle V, and fixed to a stay 51 (See FIG. 2) which extends leftward from the left door 50. The rearward imaging device 1 according to the present embodiment includes a housing 2 which constitutes an outer shell of the rearward imaging device 1 and an imaging unit 3 which images the rear side. A concavity 2a is formed in the rear portion of the housing 2. The imaging unit 3 is housed in the housing 2, and captures an image of the rear side through an opening in the concavity 2a. That is, the rearward imaging device 1 captures an image of the left rear side of the vehicle V from the left lateral side of the left door 50.

Although not explained, a similar rearward imaging device 1 is also arranged on the right door side of the vehicle V to be laterally symmetrical to the rearward imaging device 1 on the left door side. In addition, although in the example illustrated in the present embodiment the rearward imaging device 1 is arranged at each of the right and left doors, the rearward imaging device 1 may be arranged anywhere on a lateral side.

Figure 3:
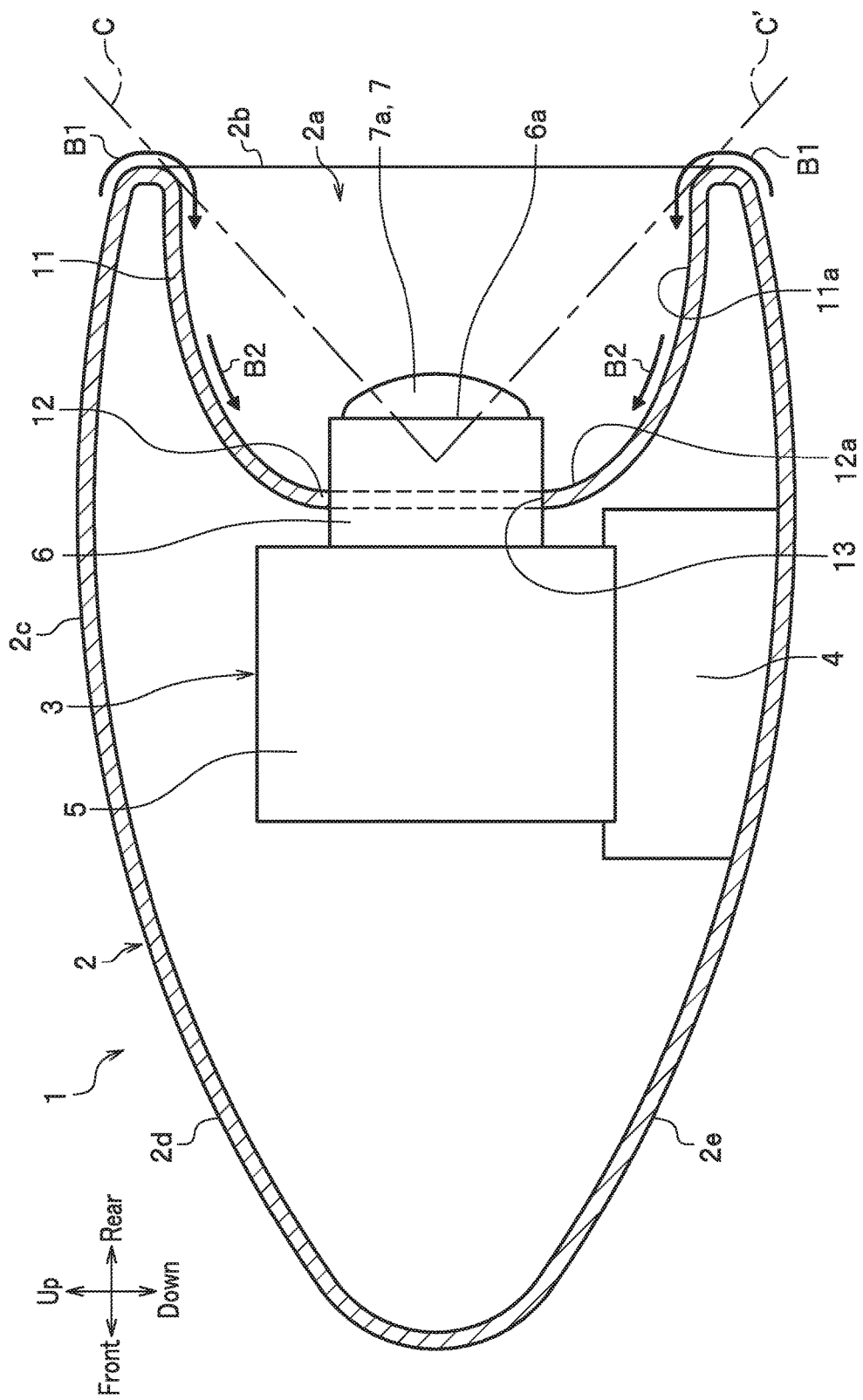
FIG. 3 is a cross-sectional view along the line A-A indicated in FIG. 2.

As illustrated in FIG. 3, the housing 2 has a space for housing the imaging unit 3. The concavity 2a, which is recessed to the forward direction from a rear end face 2b, is formed in the rear portion of the housing 2.

The rear end face 2b of the housing 2 is in the area between the rear edge of an outer circumferential surface 2c of the housing 2 and an opening edge of the concavity 2a, and has an annular shape in rear view. The opening of the concavity 2a is formed on the inner side of the rear end face 2b. Rounded (chamfered) faces are formed on an outer circumferential edge and an inner circumferential edge of the rear end face 2b from the viewpoint of securement of safety on collision.

The outer circumferential surface 2c of the housing 2 has such a shape (the so-called streamlined shape) that turbulence in the vicinity of the outer circumferential surface 2c of the housing 2 becomes more unlikely to occur as the resistance against the airflow (in the direction from the front to the rear) occurring during forward traveling of the vehicle V decreases. The outer circumferential surface 2c in the present embodiment has a paraboloidal shape, i.e., a shape tapered toward the front side.

The housing 2 is formed by assembling an upper housing member 2d and a lower housing member 2e from the upper and lower directions, where the upper housing member 2d is open downward, and the lower housing member 2e is open upward. In addition, a mounting seat 4 for the imaging unit 3 is formed in the housing 2.

As illustrated in FIG. 3, a circumferential wall portion 11 of the concavity 2a has a spherical band-like shape, and extends forward from the inner circumferential edge of the rear end face 2b. The cross-sectional shape of the circumferential wall portion 11 along a plane having the optical axis of the imaging unit 3 as a normal line is a circle. The diameter of the circumferential wall portion 11 is gradually reduced toward the front side.

A bottom portion 12 of the concavity 2a has the shape of a hollow disk having a perpendicular line in the front-rear direction. The bottom portion 12 includes a portion which smoothly continues to the front end of the circumferential wall portion 11.

The hollow located in the center of the bottom portion 12 is a through-hole 13 which penetrates through the bottom portion 12 in the front-rear direction. The barrel 6 of the imaging unit 3 is inserted through the through-hole 13. The barrel 6 is a cylindrical member in which an outer circumferential surface having a circular cross section extends in the front-rear direction.

The through-hole 13 is formed to have a shape (circular shape) identical to the outer circumferential surface of the barrel 6 such that water drops do not intrude into the inside of the housing 2 through a gap between the barrel 6 and the bore wall of the through-hole 13.

In addition, the circumferential wall portion 11 and the bottom portion 12 are located, in the radial direction, outside the angle of view of a lens 7a (i.e., the maximum extent of the scene imaged by the imaging unit 3). That is, the lens 7a is arranged such that the captured image does not include images of the circumferential wall portion 11 and the bottom portion 12.

The imaging unit 3 includes a main part 5, the barrel 6, and a plurality of lenses 7. The main part 5 is fixed to the mounting seat 4 in the housing 2. The barrel 6 extends rearward from the main part 5. The plurality of lenses 7 are housed in the barrel 6. (In FIGS. 3 and 4, only the rearmost one 7a of the lenses 7 is illustrated.)

Although the main part 5 is fixed to the mounting seat 4 in the present embodiment, the manner of fixing the imaging unit 3 is not limited to the illustrated manner. For example, it is possible to arrange inside of the housing 2 a pair of ribs extending from the upper and lower sides, and hold the imaging unit 3 with the pair of ribs.

The main part 5 converts the image of the rear side of the vehicle into an electric signal, and includes an image sensor (not shown) which can perform photoelectric conversion of the light from the lenses 7. The main part 5 transmits the acquired information (the electric signal) to a monitor or the like in the interior of the vehicle V. Thus, the image captured by the imaging unit 3 is displayed on the monitor, and the driver can confirm the situation on the left rear side by viewing the monitor.

The barrel 6 is a cylindrical member extending in the front-rear direction, and arranged to penetrate through the bottom portion 12 and be approximately perpendicular to the bottom surface 12*a*. The barrel 6 is formed to have a uniform outer diameter over the entire length in the front-rear direction.

The lens 7*a* is held at the rear end 6*a* of the barrel 6. The holding of the lens 7*a* by the barrel 6 includes the case in which the barrel 6 holds the lens 7*a* in contact with the lens 7*a*, and the case in which another member is inserted between the barrel 6 and the lens 7*a*.

The spherical surface of the lens 7*a* protrudes rearward from the rear end 6*a* of the barrel 6, and is exposed to the outside of the barrel 6. That is, the outer surface of the lens 7*a* is arranged on the rear side of the bottom portion 12 of the housing 2 (i.e., on the side nearer to the opening of the concavity 2*a*), and faces the rear side of the vehicle through the opening of the concavity 2*a*.

In addition, the lens 7*a* is arranged on the bottom portion 12 side of the opening edge of the concavity 2*a* (i.e., the rear end face 2*b* of the housing 2). Therefore, the lens 7*a* is surrounded by the circumferential wall portion 11 of the concavity 2*a*, and arranged between the opening edge of the concavity 2*a* and the bottom portion 12. Thus, the transparent body, such as the lens 7*a* or a lens filter, which is arranged nearest to the imaging side in the imaging unit 3 is arranged in the space formed by the concavity 2*a*. The imaging unit 3 captures the image of the object through the above transparent body.

The lens 7*a* in the present embodiment corresponds to the "transparent member" described in the appended claims. The angle of view of the imaging unit 3 (the angle which is made by the dashed lines C and C' indicated in FIG. 3) is 90 degrees.

The relationship between the inner surface of the concavity 2*a* and the imaging unit 3 is explained in more detail. In the following explanations, one of the outer and inner surfaces of the circumferential wall portion 11 which faces the concavity 2*a* (i.e., the surface exposed to the outside of the housing 2) is referred to as "the inner circumferential surface 11*a*", and one of the outer and inner surfaces of the bottom portion 12 which faces the concavity 2*a* is referred to as "the bottom surface 12*a*".

Figure 4:
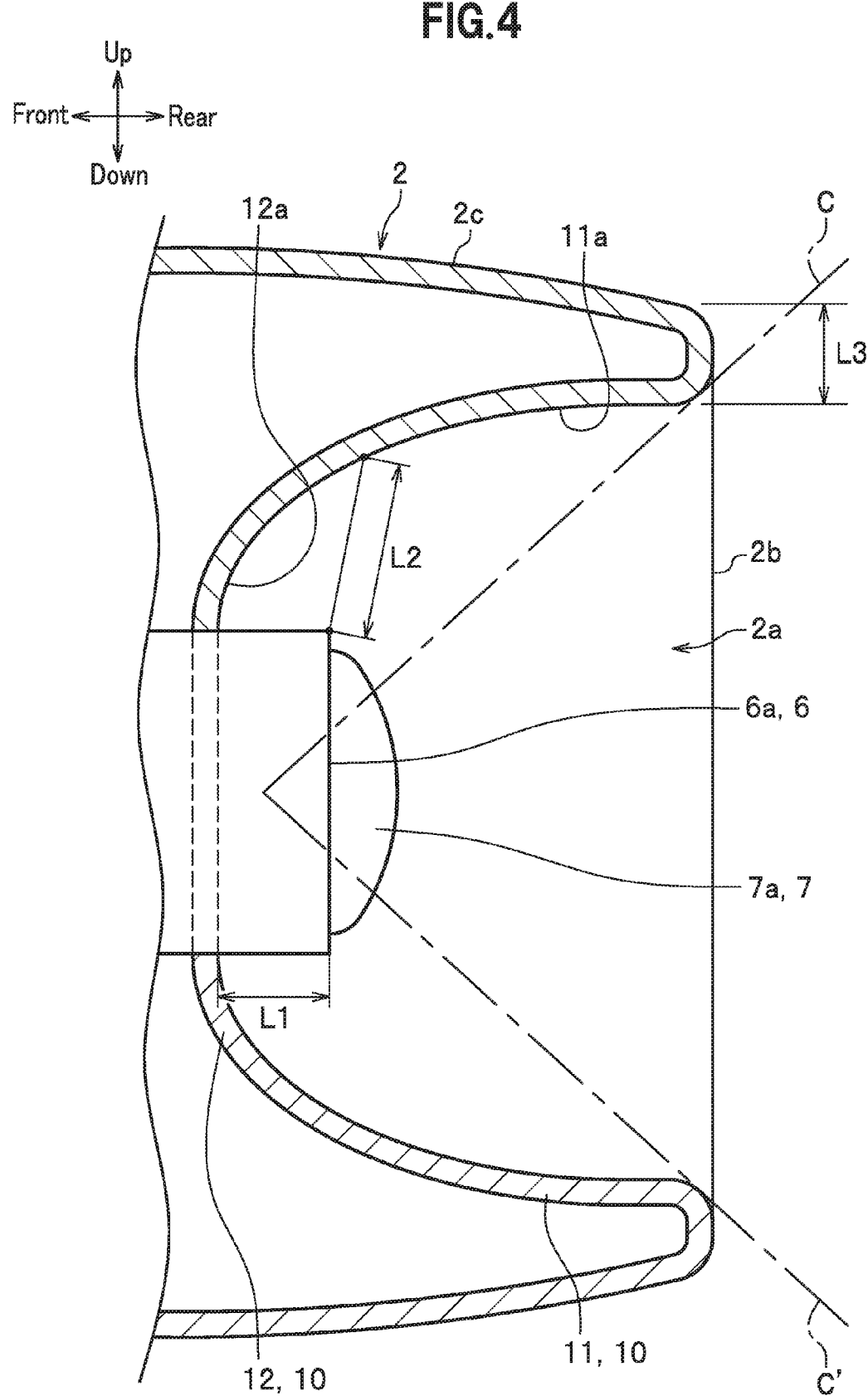
FIG. 4 is a magnified view of a rear portion of the rearward imaging device of FIG. 3.

As illustrated in FIG. 4, the barrel 6 in the imaging unit 3 protrudes rearward from the bottom surface 12*a* of the concavity 2*a*. Therefore, the lens 7*a* held by the barrel 6 is apart from the bottom surface 12*a*, and does not continue to the bottom surface 12*a*. Therefore, even when water drops which come into contact with the inner circumferential surface 11 a move to the bottom surface 12*a* side (as indicated by the arrows B2 in FIG. 3), the water drops mainly come into contact with the side surface of the barrel 6.

The protrusion length L1 in the barrel 6 is greater than the width L3 of the annular area between the rear edge of the outer circumferential surface 2*c* of the housing 2 and the opening edge of the concavity 2*a*. (Hereinafter, the width L3 is referred to as the width of the rear end face 2*b*.) In addition, the distance L2 between each position on the inner surface of the concavity 2*a* (the inner circumferential surface 11*a* and the bottom surface 12*a*) and an edge of the rear end 6*a* of the barrel 6 gradually increases as the position on the inner surface goes rearward from the bottom portion 12 side. The distance L2 is greater than the width L3 of the rear end face 2*b*.

Next, an example of a movement route of water drops during traveling of the vehicle is explained.

When the vehicle V travels in rainy weather, water drops come flying from the front side of the rearward imaging device 1 into contact with the outer circumferential surface 2*c* of the housing 2. The water drops on the outer circumferential surface 2*c* is pushed by airflow to move toward the rear end.

Most of water drops which reach the rear end of the housing 2 are scattered toward the rear side of the housing 2. However, part of the water drops can be caught by turbulence (vortex) which occurs in the vicinity of the rear end of the housing 2, and move along the rear end face 2*b* to sneak onto the inner circumferential surface 11*a* (as indicated by the arrows B1 in FIG. 3). The diameters of most of the water drops which come into contact with the rear end face 2*b* are equal to or smaller than the width L3 of the rear end face 2*b*. Therefore, the diameters of most of the water drops which come into contact with the inner circumferential surface 11*a* are also equal to or smaller than the width L3 of the rear end face 2*b*.

Part of the water drops which come into contact with the inner circumferential surface 11*a* of the concavity 2*a* move to the bottom surface 12*a* side by the influence of turbulence (vortex) (as indicated by the arrows B2 in FIG. 3). However, since the barrel 6 protrudes from the bottom surface 12*a*, the water drops which move to the bottom surface 12*a* side mainly come into contact with the outer circumferential surface of the barrel 6.

As explained before, the diameters of most of the water drops which move along the rear end face 2*b* and come into contact with the inner circumferential surface 11*a* are equal to or smaller than the width L3 of the rear end face 2*b*. In consideration of this situation, according to the present embodiment, the protrusion length L1 in the barrel 6 is set greater than the width L3 of the rear end face 2*b*. Therefore, even when the water drops reach the bottom surface 12*a*, the possibility that the water drops come into contact with the lens 7*a* is small.

In addition, according to the present embodiment, the distance L2 between the inner surface of the concavity 2*a* and the edge of the rear end 6*a* of the barrel 6 is greater than the width L3 of the rear end face 2*b*. Therefore, the possibility that the water drops come into contact with the lens 7*a* during movement toward the bottom surface 12*a* is also small.

Further, while the vehicle is stopped or traveling at low speed and influences of the turbulence are small, the water drops which move to the bottom surface 12*a* side of the bottom portion 12 and the water drops which come into contact with the outer circumferential surface of the barrel 6 move downward to the lower side of the barrel 6 by the action of gravity (as indicated by the arrows B3 in FIG. 2), and further move to the opening of the concavity 2*a* along the inner circumferential surface 11*a* on the lower side of the concavity 2*a* to be drained from the opening (as indicated by the arrow B4 in FIG. 2).

Furthermore, the barrel 6 is arranged approximately perpendicular to the bottom surface 12*a*, and the outer circumferential surface of the barrel 6 extends in a horizontal direction. Therefore, even when water drops come into contact with the outer circumferential surface of the barrel 6, the water drops are unlikely to flow rearward along the outer circumferential surface of the barrel 6.

As explained above, in the rearward imaging device 1 according to the embodiment, even when water drops move from the outer circumferential surface 2*c* of the housing 2 and are caught into the concavity 2*a*, the water drops are unlikely to come into contact with the lens 7*a*, so that influences of water drops are unlikely to be reflected in the image captured by the imaging unit 3.

In addition, the lens 7a in the imaging unit 3 is located on the front side of the rear end face 2b of the housing 2. In other words, the lens 7a is located at a deep position in the concavity 2a. In such an arrangement, rainwater, muddy water splashed by a tire, and the like are unlikely to hit the lens 7a.

Although the four-wheeled vehicle V is explained in the embodiment as an example of the movable body on which the rearward imaging device 1 is mounted, it is not intended to limit the range of the present invention to the example. For example, the present invention can be applied to vehicles having more than four wheels, and further to other types of vehicles such as handlebar vehicles and the railway vehicles, and other movable bodies such as ships, airplanes, and the like.

In addition, although the barrel 6 according to the present embodiment has a cylindrical shape and a cross-sectional shape of the outer circumferential surface is a circle, the present invention is not limited to such a structure of the barrel: For example, the cross-sectional shape of the outer circumferential surface of the barrel 6 may be formed to have a rectangular or polygonal shape.

Further, although nothing is arranged on the rear side of the lens 7a in the imaging unit 3 according to the present embodiment, it is possible to use an imaging unit which is provided with a lens filter on the rear side of the lens 7a. In the imaging unit 3 in which a transparent member such as a lens filter is arranged nearest to an imaging plane (on the rear side), and which captures the rear side through the transparent member, the transparent member in the imaging unit 3 corresponds to the transparent member in the present invention.

LIST OF REFERENCE SIGNS

1 Rearward Imaging Device
2 Housing
2a Concavity
2b Rear End Face
2c Outer Circumferential Surface
3 Imaging Unit
6 Barrel
6a Rear End
7, 7a Lenses (Transparent Member)
11 Circumferential Wall Portion
11a Inner Circumferential Surface
12 Bottom
12a Bottom Surface
13 Through-hole

The invention claimed is:

1. A rearward imaging device for being attached to a movable body, comprising:
    an imaging unit which captures an image of a rear side of the movable body; and
    a housing which houses the imaging unit;
    wherein the imaging unit includes a barrel which holds a transparent member;
    a concavity is formed in a rear portion of the housing, the concavity having at least a portion thereof extending transverse to a front-rear direction of the housing so as to define a bottom surface of the concavity;
    the barrel penetrates through the bottom surface of the concavity and protrudes rearward from the bottom surface of the concavity towards an opening edge of the concavity.

2. The rearward imaging device according to claim 1, wherein a distance from an inner surface of the concavity to an edge of a rear end of the barrel is equal to or greater than a protrusion length at which the barrel protrudes rearward from the bottom surface of the concavity.

3. The rearward imaging device according to claim 1, wherein the protrusion length of the barrel is greater than a maximum width of an annular area between a rear edge of an outer circumferential surface of the housing and the opening edge of the concavity.

4. The rearward imaging device according to claim 2, wherein the protrusion length of the barrel is greater than a maximum width of an annular area between a rear edge of an outer circumferential surface of the housing and the opening edge of the concavity.

5. The rearward imaging device according to claim 1, wherein the concavity is further defined by an annular wall that curves inwardly towards a central axis of the barrel so as to intersect the bottom surface of the concavity.

* * * * *